(12) United States Patent
Tsubaki et al.

(10) Patent No.: US 11,302,486 B2
(45) Date of Patent: Apr. 12, 2022

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP); Kazuyo Saito, Osaka (JP); Yuji Otsuka, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 78 days.

(21) Appl. No.: 16/833,951

(22) Filed: Mar. 30, 2020

(65) Prior Publication Data

US 2020/0227208 A1 Jul. 16, 2020

Related U.S. Application Data

(63) Continuation of application No. PCT/JP2018/040226, filed on Oct. 30, 2018.

(30) Foreign Application Priority Data

Oct. 31, 2017 (JP) .............................. JP2017-210677

(51) Int. Cl.
  *H01G 9/035* (2006.01)
  *H01G 9/028* (2006.01)
  *H01G 9/048* (2006.01)
(52) U.S. Cl.
  CPC ............. *H01G 9/035* (2013.01); *H01G 9/028* (2013.01); *H01G 9/048* (2013.01)

(58) Field of Classification Search
  CPC ............................. H01G 9/035; H01G 11/64
  See application file for complete search history.

(56) References Cited

U.S. PATENT DOCUMENTS 6,519,137 B1 * 2/2003 Nitta ..................... H01G 9/025
                                                    361/525
2005/0195557 A1    9/2005 Hayashi et al.
              (Continued)

FOREIGN PATENT DOCUMENTS

CN      1664968 A      9/2005
JP      6-061100       3/1994
              (Continued)

OTHER PUBLICATIONS

English Translation of Chinese Office Action dated Jun. 2, 2021 for the related Chinese Patent Application No. 201880068722.7.
              (Continued)

*Primary Examiner* — Eric W Thomas
(74) *Attorney, Agent, or Firm* — McDermott Will & Emery LLP

(57) ABSTRACT

An electrolytic capacitor includes a capacitor element and an electrolytic solution. The capacitor element includes: an anode body including a dielectric layer; a cathode body; and a solid electrolyte in contact with the dielectric layer. The electrolytic solution includes a solvent, a solute, and a polymer component. The solvent includes an ethylene glycol compound. The polymer component includes polyalkylene glycol. The polyalkylene glycol includes at least one of (i) a mixture of polyoxyethylene and polyoxypropylene and (ii) an oxyethylene-oxypropylene copolymer. In the polyalkylene glycol, a molar ratio m/n of oxyethylene units to oxypropylene units is greater than 1.

14 Claims, 1 Drawing Sheet

(56) References Cited

U.S. PATENT DOCUMENTS

2013/0279080 A1\* 10/2013 Aoyama ................ H01G 9/04
                                                                    361/534
2015/0213962 A1    7/2015 Koseki et al.

FOREIGN PATENT DOCUMENTS

| JP | 2005-251885 | | 9/2005 |
|----|----|----|----|
| JP | 2015026764 A | \* | 2/2015 |
| JP | 2015222769 A | \* | 12/2015 |
| JP | 2017-085092 | | 5/2017 |
| WO | 2014/021333 | | 2/2014 |

OTHER PUBLICATIONS

International Search Report of PCT application No. PCT/JP2018/040226 dated Jan. 15, 2019.

\* cited by examiner

ELECTROLYTIC CAPACITOR

RELATED APPLICATIONS

This application is a continuation of the PCT International Application No. PCT/JP2018/040226 filed on Oct. 30, 2018, which claims the benefit of foreign priority of Japanese patent application No. 2017-210677 filed on Oct. 31, 2017, the contents all of which are incorporated herein by reference.

BACKGROUND

1. Technical Field

The present disclosure relates to an electrolytic capacitor using a solid electrolyte and an electrolytic solution.

2. Description of the Related Art

A so-called hybrid electrolytic capacitor, which includes a solid electrolyte and an electrolytic solution, is considered to be promising as a capacitor that is small-sized and has a large capacitance and a low equivalent series resistance (ESR).

In WO 2014/021333 A, it is proposed that, in an electrolytic solution of a hybrid electrolytic capacitor, ethylene glycol and γ-butyrolactone are used as a solvent, and polyethylene glycol is added as an additive agent.

SUMMARY

An electrolytic capacitor according to the present disclosure includes a capacitor element and an electrolytic solution. The capacitor element includes: an anode body including a dielectric layer; a cathode body; and a solid electrolyte in contact with the dielectric layer. The electrolytic solution includes a solvent, a solute, and a polymer component. The solvent includes an ethylene glycol compound. The polymer component includes polyalkylene glycol. The polyalkylene glycol includes at least one of (i) a mixture of polyoxyethylene and polyoxypropylene and (ii) an oxyethylene-oxypropylene copolymer. In the polyalkylene glycol, a molar ratio m/n of oxyethylene units to oxypropylene units is greater than 1.

It is possible to sufficiently reduce a leakage current in a hybrid electrolytic capacitor that uses an electrolytic solution containing an ethylene glycol compound such as ethylene glycol.

DETAILED DESCRIPTION OF EMBODIMENT

Figure 1:
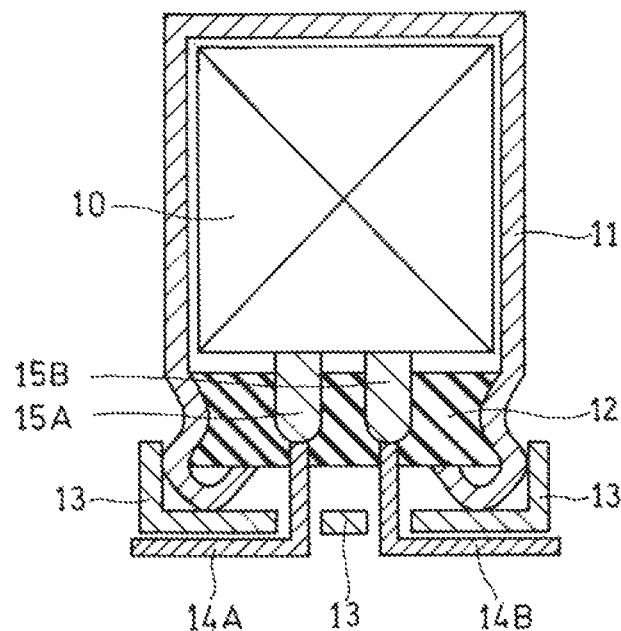
FIG. 1 is a schematic cross-sectional view illustrating an electrolytic capacitor according to an exemplary embodiment of the present disclosure.

In general, in a case of an electrolytic capacitor, a dielectric layer that is an oxide film (anodization film) is formed on a surface of an anode body to improve a withstand voltage. Since ethylene glycol compounds such as ethylene glycol and diethylene glycol do not easily dissociate a solute in an electrolytic solution, a restoration function of the oxide film tends to decline. Thus, when an electrolytic solution including the ethylene glycol compound is used, a leakage current is not sufficiently suppressed.

An electrolytic capacitor according to an exemplary embodiment of the present disclosure includes a capacitor element and an electrolytic solution. The capacitor element includes: an anode body including a dielectric layer; a cathode body; and a solid electrolyte in contact with the dielectric layer. The electrolytic solution includes a solvent, a solute, and a polymer component. The solvent includes an ethylene glycol compound. The polymer component includes polyalkylene glycol. The polyalkylene glycol includes at least one of (i) a mixture of polyoxyethylene and polyoxypropylene and (ii) an oxyethylene-oxypropylene copolymer. In the polyalkylene glycol, a molar ratio (m/n) of oxyethylene units to oxypropylene units is greater than 1.

An ethylene glycol compound such as ethylene glycol does not easily pass through a sealing member and has an effect of inhibiting transpiration of the electrolytic solution in the electrolytic capacitor, but does not easily dissociate the solute contained in the electrolytic solution. In the electrolytic capacitor, for restoration of the dielectric layer in which defects are generated, metal contained in the anode body needs to be pulled out and, at the same time, to be oxidized due to an action of anions generated by dissociation of the solute. For this reason, when an ethylene glycol compound is used for the electrolytic solution, restorability of the dielectric layer (dielectric material film) tends to decline.

In the present exemplary embodiment, there is used polyalkylene glycol (specifically, a mixture of polyoxyethylene and polyoxypropylene, and/or an oxyethylene-oxypropylene copolymer) whose molar ratio (m/n) of oxyethylene units to oxypropylene units is greater than 1. Although the action mechanism is not clear in detail, the following mechanism can be considered. By making the molar ratio (m/n) greater than 1, it is easy to position polyalkylene glycol at an appropriate position in the vicinity of the anode body. Thus, the pulling-out of the metal constituting the anode body due to the action of the anions is appropriately limited when defects are generated in the dielectric layer and the dielectric layer is then restored. Hence, the restored dielectric layer is densely formed. On the other hand, when the molar ratio (m/n) is less than or equal to 1, it is difficult to sufficiently reduce the leakage current. The reason for this can be considered as follows. When the molar ratio (m/n) is less than or equal to 1, too much polyalkylene glycol having an oxypropylene unit exists in the vicinity of the anode body. Thus, the anions do not easily act on a surface of the anode body. Hence, the restoration of the dielectric layer is interfered with. Further, in the case where the molar ratio (m/n) is less than or equal to 1, if polyalkylene glycol is in close contact with the anode body, pores and recesses (pits) on the surface of the anode body are blocked. Hence, capacitance cannot be obtained in some cases. In the present exemplary embodiment, since the molar ratio (m/n) is made greater than 1, such blocking of the pits can be suppressed. Such polyalkylene glycol as described above improves the restorability of the dielectric layer of the electrolytic capacitor, and thus the leakage current can be reduced.

Note that the polyalkylene glycol is a mixture of polyoxyethylene and polyoxypropylene and/or is an oxyethylene-oxypropylene copolymer. When the polyalkylene glycol is the mixture of polyoxyethylene and polyoxypropylene, polyoxypropylene can be easily located in the vicinity of the anode body and the like. The oxyethylene-oxypropylene copolymer helps the polyalkylene glycol to be located at an appropriate position in the vicinity of the anode body. And thus the restorability of the dielectric layer is further improved. Further, since the oxyethylene-oxypropylene copolymer has a chain structure as a main structure (or a main chain of the oxyethylene-oxypropylene copolymer has a chain structure), the oxyethylene-oxypropylene copolymer moves in the electrolytic solution more easily than a polymer having a branch structure. Thus, the oxyethylene-oxypropylene copolymer can be easily disposed in the vicinity of the dielectric layer, so that the restorability of the dielectric layer can be improved.

Hereinafter, the present disclosure will be described more specifically with reference to the exemplary embodiment. However, the following exemplary embodiment does not limit the present disclosure.

Figure 2:
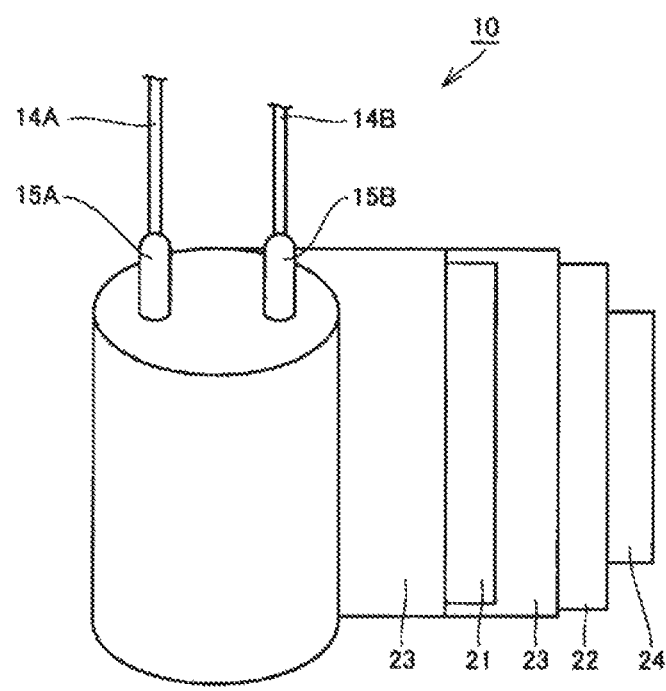
FIG. 2 is a schematic diagram for describing a configuration of a capacitor element according to the exemplary embodiment.

FIG. 1 is a schematic cross-sectional view illustrating an electrolytic capacitor according to the present exemplary embodiment, and FIG. 2 is a schematic diagram showing a partially developed view of a capacitor element according to the electrolytic capacitor.

The electrolytic capacitor includes, for example, capacitor element 10, cylindrical case 11 that houses capacitor element 10, sealing member 12 that closes an opening of case 11, and seat plate 13 that covers sealing member 12. The electrolytic capacitor further includes: lead wires 14A, 14B led through through-holes in sealing member 12 and penetrating through seat plate 13; and lead tabs 15A, 15B connecting between lead wires 14A, 14B and electrodes of capacitor element 10. A part of case 11 in the vicinity of an open end of case 11 is drawn inward, and the open end is curled to be swaged to sealing member 12.

Capacitor element 10 is made of a wound body shown in FIG. 2. The wound body includes anode body 21 connected to lead tab 15A, cathode body 22 connected to lead tab 15B, and separator 23. The wound body is a half-finished product, where no solid electrolyte is formed between anode body 21 and cathode body 22.

Anode body 21 and cathode body 22 are wound with separator 23 disposed between anode body 21 and cathode body 22. The outermost periphery of the wound body is fixed with winding stop tape 24. FIG. 2 illustrates the wound body, where the outermost periphery of the wound body is not yet fastened and a part of the wound body is partially developed.

Anode body 21 includes a metal foil whose surface is roughened to have projections and recesses, and the dielectric layer is formed on the metal foil having the projections and recesses. A solid electrolyte is attached to at least a part of a surface of the dielectric layer. The solid electrolyte may cover at least a part of a surface of cathode body 22 and/or a part of a surface of separator 23. Capacitor element 10 in which the solid electrolyte is formed is housed in case 11 together with the electrolytic solution (not shown).

(Electrolytic Solution)

The electrolytic solution includes a solvent, a solute, and a polymer component. The electrolytic solution can be prepared by mixing constituents.

(Solvent)

The solvent includes at least an ethylene glycol compound (first solvent). As the ethylene glycol compound, ethylene glycol or polyethylene glycol having oxyethylene units at repeating number ranging from 2 to 8, inclusive. Examples of polyethylene glycol used as the first solvent include diethylene glycol, triethylene glycol, tetraethylene glycol, pentaethylene glycol, and hexaethylene glycol. A repeating number of oxyethylene units in the polyethylene glycol may preferably range from 2 to 6, inclusive, and may range from 2 to 4, inclusive. One type of ethylene glycol compound may be used alone, or two or more types may be used in combination. Among others, ethylene glycol is preferable since ethylene glycol does not easily pass through a sealing body. Further, compared with the other first solvents, ethylene glycol has a low viscosity, and thus the ethylene glycol easily solves the solute. Further, since ethylene glycol has high thermal conductivity, and is excellent in heat radiation performance when a ripple current is generated, ethylene glycol also has an effect to improve heat resistance of the capacitor.

The solvent may include a second solvent other than an ethylene glycol compound. Examples of the second solvent include non-aqueous solvents such as an organic solvent and an ionic liquid.

Examples of the non-aqueous solvent include glycol compounds other than an ethylene glycol compound, a sulfone compound, a lactone compound, and a carbonate compound. Examples of the glycol compound include propylene glycol, trimethylene glycol, 1,4-butanediol, pentanediol, and hexanediol. Examples of the sulfone compound include chain sulfone (such as dimethyl sulfone, and diethyl sulfone), cyclic sulfone (such as sulfolane, 3-methylsulfolane, 3,4-dimethylsulfolane, and 3,4-diphenylmethylsulfolane). Examples of the lactone compound include γ-butyrolactone (GBL) and γ-valerolactone. Examples of the carbonate compound include dimethyl carbonate, diethyl carbonate, ethyl methyl carbonate, ethylene carbonate, propylene carbonate, and fluoroethylene carbonate. One type of second solvent may be used alone, or two or more types may be used in combination.

A proportion of the ethylene glycol compound in the solvent is preferably more than or equal to 10% by mass and is further preferably more than or equal to 20% by mass or more than or equal to 30% by mass. When the proportion of the ethylene glycol compound is in the above range, the restorability of the dielectric layer tends to decline. In the present exemplary embodiment, by using polyalkylene glycol having the m/n ratio of greater than 1, it is possible to form a dense dielectric layer. Hence, even if the ratio of the ethylene glycol compound is in the above range, it is possible to improve the restorability of the dielectric layer and to thus suppress the leakage current. Further, when the proportion of the ethylene glycol compound is in the above range, it is also easy to achieve an effect to reduce transpiration of the solvent. An upper limit of the proportion of the ethylene glycol compound in the solvent is not particularly limited, and the proportion may be less than or equal to 100% by mass. From a viewpoint of easily securing high restorability of the dielectric layer, the proportion of the ethylene glycol compound in the solvent may be less than or equal to 70% by mass. These lower limits and upper limits can be arbitrarily combined.

Further, when at least a sulfone compound is used as the second solvent, a degree of dissociation of the solute can be easily improved. Thus, the restorability of the dielectric layer can be further improved. The sulfone compound is an organic compound having a sulfonyl group ($-SO_2-$) in the molecule. Examples of the sulfone compound include chain sulfone and cyclic sulfone. Examples of the chain sulfone include dimethyl sulfone, diethyl sulfone, dipropyl sulfone, and diphenyl sulfone. Examples of the cyclic sulfone include sulfolane, 3-methylsulfolane, 3,4-dimethylsulfolane, and 3,4-diphenylmethylsulfolan. From a viewpoint of dissociability of the solute and thermal stability, the sulfone compound is preferably sulfolane among others. Sulfolane has low viscosity compared with the other sulfone compounds and thus easily solves the solute. When a sulfone compound is contained in the solvent, the proportion of the sulfone compound in the solvent is preferably more than or equal to 10% by mass and less than or equal to 70% by mass.

(Solute)

As the solute, an ionic substance such as salt of an acid component and a base component is preferable. At least part of the salt is dissociated in the electrolytic solution to generate cations and anions. Since the solute includes an acid component and a base component, the degree of dissociation is increased, whereby the restorability of the dielectric layer can be improved. Note that when the electrolytic solution is prepared, the salt may be added to the solvent, or the acid component and the base component may be added to the solvent. Alternatively, the salt, and the acid component and/or the base component may be added to the solvent.

The acid component is preferably organic acid. Examples of the organic acid include organic carboxylic acid and anhydride of organic carboxylic acid. Examples of the organic acid include aromatic carboxylic acid, aliphatic carboxylic acid, and alicyclic carboxylic acid. Examples of the aromatic carboxylic acid include phthalic acid, isophthalic acid, terephthalic acid, benzoic acid, salicylic acid, trimellitic acid, and pyromellitic acid. Examples of the alicyclic carboxylic acid include maleic acid and adipic acid. Examples of the alicyclic carboxylic acid include hydride of aromatic carboxylic acid. A phthalic acid is preferable since the phthalic acid provides high restorability of the dielectric layer and high thermal stability. One of the acid components may be used or, two or more of the acid components may be used in combination.

The base component is preferably an organic base. Examples of the organic base include an amine compound, a quaternary amidinium compound, and a quaternary ammonium compound. The amine compound may be any of the primary, secondary, and tertiary amines. Examples of the amine compound include aliphatic amine, aromatic amine, and heterocyclic amine. One type of base component may be used alone, or two or more types may be used in combination.

Specific examples of the amine compound include methylamine, dimethylamine, monoethyldimethylamine, trimethylamine, ethylamine, diethylamine, triethylamine, ethylenediamine, N,N-diisopropylethylamine, tetramethylethylenediamine, hexamethylenediamine, spermidine, spermine, amantadine, aniline, phenethylamine, toluidine, pyrrolidine, piperidine, piperazine, morpholine, imidazole, imidazoline, pyridine, pyridazine, pyrimidine, pyrazine, and 4-dimethylaminopyridine.

As the quaternary amidinium compound, it is preferable to use a quaternary compound of an annular amidine compound, and examples of the quaternary compound include an imidazolium compound and an imidazolinium compound. Examples of the quaternary imidazolium compound include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, and 1,3-diethyl-2-methylimidazolium. Examples of the quaternary imidazolinium compound include 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, and 1,2,3,4-tetramethylimidazolinium.

As the quaternary ammonium compound, it is preferable to use, for example, diethydimethylammonium, monoethyltrimethylammonium, or the like.

From a viewpoint of suppressing deterioration of the solid electrolyte and improving the restorability of the dielectric layer, a molar ratio (acid component/base component) of the acid component to the base component is preferably more than or equal to 1.1 and less than or equal to 10.0.

The concentration of the acid component in the electrolytic solution preferably ranges from 5% by mass to 50% by mass, inclusive, and further preferably ranges from 10% by mass to 30% by mass, inclusive. The concentration of the base component in the electrolytic solution preferably ranges from 1% to 40% by mass, inclusive, and further preferably ranges from 3% by mass to 20% by mass, inclusive. In the above cases, the restorability of the dielectric layer can be further improved.

(Polymer Component)

The polymer component contains at least polyalkylene glycol (first polymer), and may further contain a second polymer other than polyalkylene glycol. As the polyalkylene glycol, a mixture of polyoxyethylene and polyoxypropylene, and/or an oxyethylene-oxypropylene copolymer is used. Here, in the polyalkylene glycol, a molar ratio (m/n) of oxyethylene units ($-O-CH_2-CH_2-$) to oxypropylene units ($-O-CH(-CH_3)-CH_2-$) is greater than 1. By using such polyalkylene glycol, the restorability of the dielectric layer is improved as described above, and thus the leakage current can be reduced.

It is enough that the m/n ratio is greater than 1. From a viewpoint of easily locating the polyalkylene glycol at an appropriate position in the vicinity of the anode body, the m/n ratio is preferably more than or equal to 1.1, and is further preferably more than or equal to 1.2. When the m/n ratio is less than or equal to 1, the restorability of the dielectric layer is insufficient as described above, and the capacitance may be low in some cases. From a viewpoint of easily locating the polyalkylene glycol in the vicinity of the anode body, the m/n ratio is preferably less than or equal to 10 and may be less than or equal to 5. These lower limits and upper limits can be arbitrarily combined.

In an electrolytic capacitor, the m/n ratio of polyalkylene glycol contained in the electrolytic solution is calculated, for example, by using NMR (Nuclear Magnetic Resonance) analysis by using the electrolytic solution taken out from the electrolytic capacitor.

Note that, in the above copolymer, the arrangement of oxyethylene units and oxypropylene units is not particularly limited. The copolymer may be a random copolymer or may be a block copolymer. Further, the copolymer may be a copolymer that has a part where oxyethylene units and oxypropylene units are arranged at random and have a polyoxyethylene block and/or a polyoxypropylene block.

A number-average molecular weight (Mn) of each of polyoxyethylene, polyoxypropylene, and the above copolymer preferably ranges from 200 to 5,000, inclusive, and further preferably ranges from 1,000 to 3,000, inclusive. By using materials having the above Mn, polyalkylene glycol can be located in the vicinity of the anode body while affinity between polyalkylene glycol and the solvent is being secured to a certain extent. Note that Mn is a number-average molecular weight converted to polystyrene, and the number-average molecular weight is calculated by using gel permeation chromatography.

A concentration of each of polyoxyethylene, polyoxypropylene, and the above copolymer in the electrolytic solution is preferably less than or equal to 50% by mass and is further preferably less than or equal to 40% by mass, or less than or equal to 30% by mass. When the concentration is in the above ranges, the restorability of the dielectric layer in the electrolytic solution can be further improved. From a viewpoint of preventing diffusion of aluminum, the concentration of each of the polyoxyethylene, polyoxypropylene and the above copolymer in the electrolytic solution is preferably more than or equal to 5% by mass.

(Ester Compound)

The electrolytic solution may further contain at least one type of ester compound selected from a group consisting of a condensation product of a boric acid and a hydroxy compound and a condensation product of a phosphoric acid and a hydroxy compound. In the present exemplary embodiment, when an ethylene glycol compound and an acid component as the solute are used, water is generated by dehydration condensation in the electrolytic solution. Thus, the water is vaporized at the time of a reflow treatment to cause an internal pressure of the electrolytic capacitor increase in some cases. When an ester compound is added, hydrolysis of the ester compound can reduce an amount of water in the electrolytic capacitor. Hence, it is possible to suppress the increase in the internal pressure of the electrolytic capacitor at the time of the reflow treatment. As a result, it is possible to suppress mounting failure of the electrolytic capacitor caused by deformation of the sealing member in association with the increase in the internal pressure and other failures. Note that, since an ester compound does not solve the solute almost at all, the ester compound is not counted in the solvent in the electrolytic solution.

The boric acid is preferably orthoboric acid, and the phosphoric acid is preferably orthophosphoric acid.

The hydroxy compound may be any of monool and polyol. The hydroxy compound may be sugar alcohol. From a viewpoint of improving a withstand voltage, polyol is preferably used as the hydroxy compound. In addition to improvement of the withstand voltage, from a viewpoint of improving the effect of reducing water, diol such as polyalkylene glycol is preferable among polyols. Further, polyalkylene glycol monoalkyl ether is preferable among monools. As necessary, it is possible to use both of; a condensation product of boric acid or phosphoric acid and polyol; and a condensation product of boric acid or phosphoric acid and monool.

In the boric ester, the molar ratio (boric acid:hydroxy compound) ranges, for example, from 1:3 to 6:1, inclusive, and preferably ranges from 1:3 to 1:1, inclusive. In the phosphoric ester, the molar ratio (phosphoric acid hydroxy compound) ranges, for example, from 1:3 to 6:1, inclusive, and preferably ranges from 1:3 to 1:1, inclusive.

Examples of polyalkylene glycol monoalkyl ether include a compound expressed by a general formula: $H(OC_2H_4)_qOC_pH_{2p+1}$, where p is an integer ranging from 1 to 500, inclusive, and q is an integer ranging from 2 to 20, inclusive. Specifically, examples of the polyalkylene glycol monoalkyl ether include triethylene glycol monomethyl ether and tetraethylene glycol monomethyl ether.

Examples of the polyalkylene glycol include a compound expressed by a general formula: $H(OC_2H_4)_rOH$, where r is an integer ranging from 2 to 500, inclusive. Specifically, examples of the polyalkylene glycol include diethylene glycol and triethylene glycol.

The content proportion of the ester compound in the whole electrolytic solution (including the ester compound) preferably ranges from 5% by mass to 40% by mass, inclusive, and further preferably ranges from 10% by mass to 30% by mass, inclusive.

(Capacitor Element 10)

Capacitor element 10 includes an anode body including a dielectric layer; a cathode body; and a solid electrolyte in contact with the dielectric layer. Capacitor element 10 normally includes a separator disposed between the anode body and the cathode body.

(Anode Body)

Examples of the anode body include a metal foil having a roughened surface. Although a type of metal constituting the metal foil is not particularly limited, it is preferable to use a valve metal such as aluminum, tantalum, or niobium or to use an alloy containing a valve metal from a viewpoint of easiness in forming the dielectric layer.

Roughening of the surface of the metal foil can be performed by a publicly known method. By the surface roughening, a plurality of projections and recesses are formed in the surface of the metal foil. The surface roughening is preferably performed, for example, by subjecting the metal foil to an etching treatment. The etching treatment may be performed, for example, by a direct current electrolyzing method or an alternating current electrolyzing method.

(Dielectric Layer)

The dielectric layer is formed on a surface of the anode body. Specifically, the dielectric layer is formed on the roughened surface of the metal foil, so that the dielectric layer is formed along an inner wall surface of pores and recesses (pits) at the surface of the anode body.

Although a method for forming the dielectric layer is not particularly limited, the dielectric layer can be formed by an anodizing treatment of the metal foil. The anodizing treatment may be performed, for example, by immersing the metal foil in an anodizing solution such as an ammonium adipate solution. In the anodizing treatment, a voltage may be applied as necessary while the metal foil is being immersed in the anodizing solution.

Normally, from a viewpoint of mass productivity, a large metal foil made of, for example, a valve metal is subjected to the surface roughening treatment and the anodizing treatment. In this case, the foil that has been subjected to the above treatments is cut in a desired size to prepare the anode body on which the dielectric layer is formed.

(Cathode Body)

As the cathode body, a metal foil is used, for example. A type of the metal is not particularly limited, but it is preferable to use a valve metal such as aluminum, tantalum, or niobium or to use an alloy including a valve metal. The cathode body may be subjected to a surface roughening treatment and/or an anodizing treatment as necessary. The surface roughening treatment and the anodizing treatment can be performed by, for example, the method described with respect to the anode body.

(Separator)

The separator is not particularly limited. For example, it is possible to use an unwoven fabric containing a fiber material such as cellulose, polyethylene terephthalate, vinylon, or polyamide (for example, aliphatic polyamide or aromatic polyamide such as aramid).

(Solid Electrolyte)

The solid electrolyte contains, for example, a manganese compound or a conductive polymer. As the conductive polymer, it is possible to use, for example, polypyrrole, polythiophene, polyaniline, or derivatives of these polymers. The solid electrolyte containing the conductive polymer can be formed by, for example, chemical polymerization and/or electrolytic polymerization of raw material monomers on the dielectric layer. Alternatively, the solid electrolyte can be formed by applying, to the dielectric layer, a solution in which the conductive polymer is solved or a dispersion liquid in which the conductive polymer is dispersed.
(Others)

Capacitor element 10 can be produced by a publicly known method. For example, capacitor element 10 may be produced as follows: an anode body on which a dielectric layer is formed and a cathode body are stacked with a separator disposed between the anode body and the cathode body; and a solid electrolyte layer is then formed between the anode body and the cathode body. Capacitor element 10 may also be produced as follows: a wound body as illustrated in FIG. 2 is formed by winding an anode body on which a dielectric layer is formed and a cathode body, with the separator disposed between the anode body and the cathode body; and a solid electrolyte layer is formed between the anode body and the cathode body. When the wound body is formed, the anode body and the cathode body may be wound while lead tabs 15A, 15B are rolled in the wound body, so that lead wires 14A, 14B stand up from the wound body as shown in FIG. 2.

One of the anode body, the cathode body, and the separator, which is located to be the outermost layer of the wound body (cathode body 22 in FIG. 2), is fixed with a winding stop tape at an end part of its outer surface. Note that when the anode body is prepared by cutting a large-sized metal foil, an anodizing treatment may further be performed on the capacitor element in the form of the wound body or the like so as to provide the dielectric layer on a cutting surface of the anode body.

Capacitor element 10 and the prepared electrolytic solution are housed in case 11, and then an opening of case 11 is sealed with sealing member 12. In this way, the electrolytic capacitor is produced.

EXAMPLES

Hereinafter, the present disclosure is specifically described with reference to examples and comparative examples. However, the present disclosure is not limited to the examples below.

Example 1

In this example, there were produced wound type electrolytic capacitors (diameter of 10 mm×length of 10 mm) having a rated voltage of 35 V and a rated capacitance of 270 μF. Hereinafter, a specific method for manufacturing each electrolytic capacitor will be described.
(Production of Capacitor Element)

A dielectric layer was formed by performing an anodizing treatment, by using an ammonium adipate solution, on an aluminum foil having a roughened surface. The obtained anode foil was cut in a predetermined size. A wound body was prepared by connecting a lead tab to each of aluminum foils as an anode foil and a cathode foil, winding the anode foil and the cathode foil with a separator disposed between the anode foil and the cathode foil, and fixing an outer surface with a winding stop tape. In this process, the anode body and the cathode body were wound around the lead tabs such that the lead tabs and lead wires integrated into the lead tabs were led out from the wound body. The anodizing treatment was performed again on the wound body by using the ammonium adipate solution.

The wound body was immersed for 5 minutes in a conductive polymer dispersion, contained in a predetermined container, containing polyethylenedioxythiophene, polystyrenesulfonic acid, and water. Thereafter, the wound body was taken out from the conductive polymer dispersion. The wound body impregnated with the conductive polymer dispersion was dried for 20 minutes in a 150° C. in drying furnace to fix the conductive polymer between the anode foil and the cathode foil of the wound body. A capacitor element was completed in this manner and was housed in a bottomed cylindrical case having a diameter of 10 mm and a length of 10 mm.
(Impregnation with Electrolytic Solution)

An electrolytic solution was injected into the case and impregnated in the capacitor element in a decompressed atmosphere (40 kPa). As the electrolytic solution, a solution was used that was obtained by dissolving phthalic acid and triethylamine as the solute, and an oxyethylene-oxypropylene copolymer in the solvent containing ethylene glycol and sulfolane at a mass ratio of 1:1. In the electrolytic solution, concentration of the phthalic acid component was 20% by mass, concentration of the triethylamine component was 5% by mass, and concentration of the copolymer was 20% by mass. The molar ratio (m/n) of oxyethylene units to oxypropylene units in the copolymer was 1.3, and the Mn of the copolymer was 1,700.
(Sealing of Capacitor Element)

The capacitor element impregnated with the electrolytic solution was encapsulated to complete each electrolytic capacitor. Specifically, the capacitor element was sealed in a bottomed case in the following manner: the capacitor element was housed in the bottomed case with lead wires positioned on an opening side of the bottomed case; and a sealing member (an elastic material including butyl rubber as a rubber component) that was formed to allow the lead wires to penetrate through the sealing member was disposed above the capacitor element. Then, a part of the bottomed case in the vicinity of an open end was drawn. In addition, the open end was curled, and a seat plate was disposed at the curled part to complete each electrolytic capacitor shown in FIG. 1. After that, an aging treatment was performed with a voltage applied.

Example 2

An electrolytic solution was prepared in the same manner as in Example 1 except that a mixture of polyoxyethylene (Mn: 1,000) and polyoxypropylene (Mn: 1,000) was used instead of the copolymer, and an electrolytic capacitor was assembled. In the electrolytic solution, concentration of the polyoxyethylene was 10% by mass, and concentration of the polyoxypropylene was 10% by mass. In the whole used polyoxyethylene and polyoxypropylene, the molar ratio (m/n) of oxyethylene units to oxypropylene units was 1.3.

Example 3

The molar ratio (m/n) of oxyethylene units to oxypropylene units in the oxyethylene-oxypropylene copolymer was changed to 1.05. An electrolytic solution was prepared in the same manner as in Example 1 except the above change, and an electrolytic capacitor was assembled.

Example 4

The molar ratio (m/n) of oxyethylene units to oxypropylene units in the oxyethylene-oxypropylene copolymer was changed to 2.0. An electrolytic solution was prepared in the same manner as in Example 1 except the above change, and an electrolytic capacitor was assembled.

Example 5

The molar ratio (m/n) of oxyethylene units to oxypropylene units in the oxyethylene-oxypropylene copolymer was changed to 5.0. An electrolytic solution was prepared in the same manner as in Example 1 except the above change, and an electrolytic capacitor was assembled.

Example 6

An electrolytic solution was prepared in the same manner as in Example 1 except that a condensation product of boric acid and a hydroxy compound was added to the electrolytic solution, and an electrolytic capacitor was assembled. As the condensation product of boric acid and a hydroxy compound, a condensation product of boric acid and a monool compound and a condensation product of boric acid and a diol compound were used. The molar ratio of the monool compound to the diol compound (monool compound:diol compound) was 1:1. Triethylene glycol monomethyl ether was used as the monool compound, and diethylene glycol was used as the diol compound.

Comparative Example 1

An electrolytic solution was prepared in the same manner as in Example 1 except that polyethylene glycol (Mn: 1,000) was used instead of the copolymer, and an electrolytic capacitor was assembled. Concentration of the polyethylene glycol in the electrolytic solution was 50% by mass.

Comparative Example 2

An electrolytic solution was prepared in the same manner as in Example 1 except that the molar ratio (m/n) of oxyethylene units to oxypropylene units in the oxyethylene-oxypropylene copolymer was changed to 0.67, and an electrolytic capacitor was assembled.

Comparative Example 3

In the electrolytic solution, concentration of the polyoxyethylene was respectively 17% by mass, and concentration of the polyoxypropylene was 33% by mass. And the molar ratio (m/n) of oxyethylene units to oxypropylene units in the whole used polyoxyethylene and polyoxypropylene was 0.67. An electrolytic solution was prepared in the same manner as in Example 2 except the above concentrations and molar ratio, and an electrolytic capacitor was assembled in the same manner as in Example 1.

[Evaluations]

Leakage currents were measured in the following procedure by using the electrolytic capacitors obtained in the examples and the comparative examples. With respect to each of the examples and the comparative examples, ten electrolytic capacitors were randomly chosen, and then these electrolytic capacitors were left under a condition at temperature of 155° C. in 3,000 hours. After that, a voltage of 35V was applied between the anode body and the cathode body in each electrolytic capacitor, and a leakage current (LC) after 120 seconds from the application of the voltage was measured. Subsequently, an average of LC values for ten electrolytic capacitors was calculated with respect to the each of the examples and the comparative examples. The results are shown in Table 1. Examples 1 to 6 are respectively represented by A1 to A6, and Comparative Examples 1 to 3 are respectively represented by B1 to B3.

TABLE 1

| | Average value of LC ($\mu$A) |
|---|---|
| A1 | 3.4 |
| A2 | 3.6 |
| A3 | 4.8 |
| A4 | 4.5 |
| A5 | 5.0 |
| A6 | 3.5 |
| B1 | 76.4 |
| B2 | 18.3 |
| B3 | 35.6 |

As shown in Table 1, the average values of LC for the examples are largely reduced compared with the comparative examples. Further, regarding the electrolytic capacitors of A6, in which the electrolytic solution including an ester compound was used, an increase of the internal pressure at the time of reflow treatment was suppressed compared with the other electrolytic capacitors.

The present disclosure is appropriate to a hybrid electrolytic capacitor using a solid electrolyte and an electrolytic solution.

What is claimed is:

1. An electrolytic capacitor comprising a capacitor element and an electrolytic solution, the capacitor element including: an anode body including a dielectric layer; a cathode body; and a solid electrolyte in contact with the dielectric layer, wherein:
   the electrolytic solution includes a solvent, a solute, and a polymer component,
   the solvent includes an ethylene glycol compound,
   the polymer component includes polyalkylene glycol,
   the polyalkylene glycol includes a mixture of polyoxyethylene and polyoxypropylene, and
   a molar ratio m/n of oxyethylene units to oxypropylene units in the polyalkylene glycol is greater than 1.

2. The electrolytic capacitor according to claim 1, wherein a proportion of the ethylene glycol compound in the solvent is more than or equal to 10% by mass.

3. The electrolytic capacitor according to claim 1, wherein the ethylene glycol compound is at least one selected from a group consisting of ethylene glycol and polyethylene glycol, the polyethylene glycol including oxyethylene units at repeating number ranging from 2 to 8, inclusive.

4. The electrolytic capacitor according to claim 1, wherein:
   a number-average molecular weight of the polyoxyethylene ranges from 200 to 5,000, inclusive, and
   a number-average molecular weight of the polyoxypropylene ranges from 200 to 5,000, inclusive.

5. The electrolytic capacitor according to claim 1, wherein:
   a concentration of the polyoxyethylene in the electrolytic solution is less than or equal to 50% by mass, and
   a concentration of the polyoxypropylene in the electrolytic solution is less than or equal to 50% by mass.

6. The electrolytic capacitor according to claim 1, wherein the solute includes an acid component and a base component.

7. The electrolytic capacitor according to claim 1, wherein the electrolytic solution further includes at least one kind of ester compound selected from a group consisting of (i) a condensation product of a boric acid and a hydroxy compound and (ii) a condensation product of a phosphoric acid and a hydroxy compound.

8. An electrolytic capacitor comprising a capacitor element and an electrolytic solution, the capacitor element including: an anode body including a dielectric layer; a cathode body; and a solid electrolyte in contact with the dielectric layer, wherein:
   the electrolytic solution includes a solvent, a solute, and a polymer component,
   the solvent includes an ethylene glycol compound,
   the polymer component includes polyalkylene glycol,
   the polyalkylene glycol includes an oxyethylene-oxypropylene copolymer, and
   a molar ratio m/n of oxyethylene units to oxypropylene units in the polyalkylene glycol is greater than 1 and less than or equal to 2.

9. The electrolytic capacitor according to claim 8, wherein a proportion of the ethylene glycol compound in the solvent is more than or equal to 10% by mass.

10. The electrolytic capacitor according to claim 8, wherein the ethylene glycol compound is at least one selected from a group consisting of ethylene glycol and polyethylene glycol, the polyethylene glycol including oxyethylene units at repeating number ranging from 2 to 8, inclusive.

11. The electrolytic capacitor according to claim 8, wherein a number-average molecular weight of the oxyethylene-oxypropylene copolymer ranges from 200 to 5,000, inclusive.

12. The electrolytic capacitor according to claim 8, wherein a concentration of the oxyethylene-oxypropylene copolymer in the electrolytic solution is less than or equal to 50% by mass.

13. The electrolytic capacitor according to claim 8, wherein the solute includes an acid component and a base component.

14. The electrolytic capacitor according to claim 8, wherein the electrolytic solution further includes at least one kind of ester compound selected from a group consisting of (i) a condensation product of a boric acid and a hydroxy compound and (ii) a condensation product of a phosphoric acid and a hydroxy compound.

* * * * *